Sept. 16, 1969  C. K. N. PATEL ET AL  3,467,917
FIELD-TUNABLE RAMAN OPTICAL DEVICE
Filed Sept. 26, 1967  3 Sheets-Sheet 1
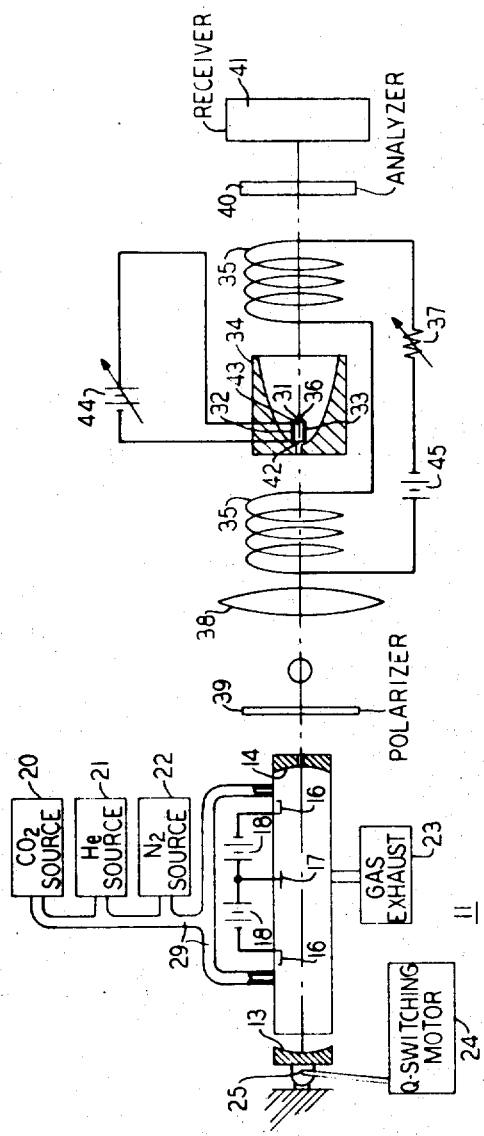
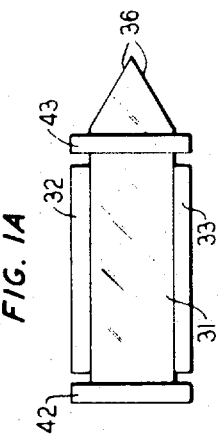
INVENTORS C. K. N. PATEL
R. E. SLUSHER
BY
Wilford L. Wisner
ATTORNEY

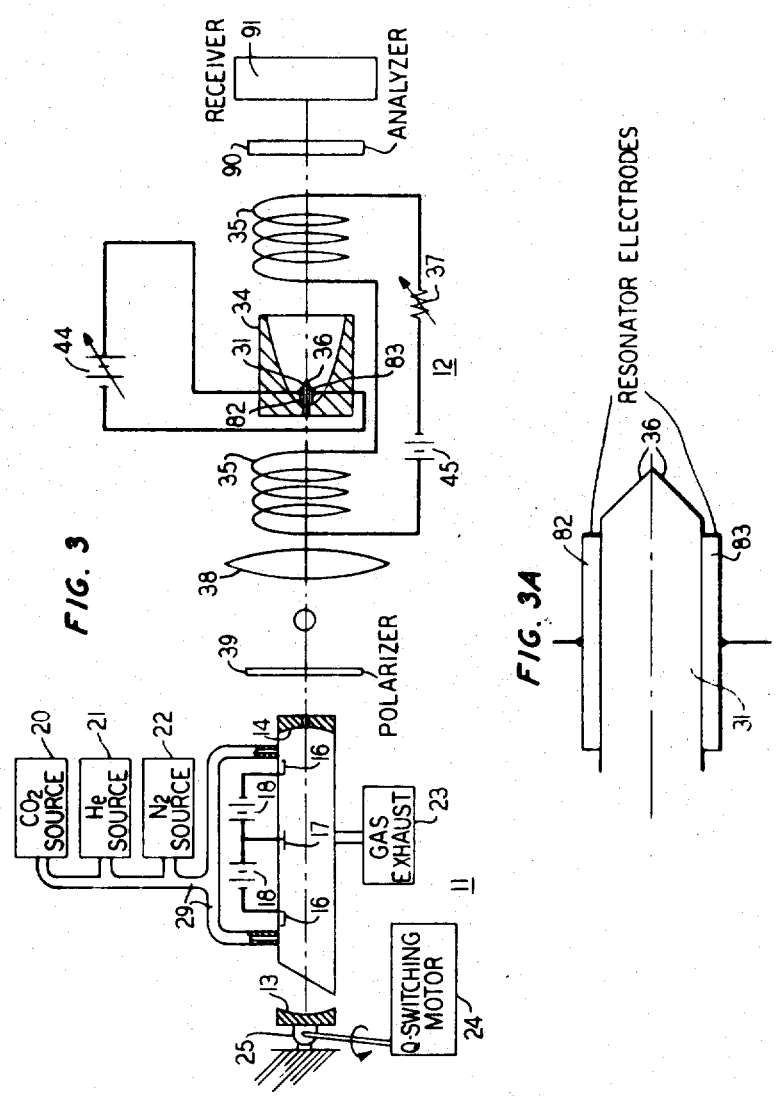

United States Patent Office 3,467,917
Patented Sept. 16, 1969

3,467,917
FIELD-TUNABLE RAMAN OPTICAL DEVICE
Chandra K. N. Patel, Chatham, and Richart E. Slusher, Millington, N.J., assignors to Bell Telephone Laboratories, Incorporated, Berkeley Heights, N.J., a corporation of New York
Filed Sept. 26, 1967, Ser. No. 670,607
Int. Cl. H01s 3/08
U.S. Cl. 332—7.51          4 Claims

ABSTRACT OF THE DISCLOSURE

A magnetic-field-tunable Raman optical device employs electric field enhancement of the cross-section for Raman scattering in materials having nonparabolic conduction bands. Optical device oscillation can be achieved at lower charge carrier concentrations than would otherwise be necessary; or modulated coherent scattered light can be obtained. The electric field is applied parallel to the magnetic field for the transition in which $\Delta l=1$, where $l$ is the Landau level quantum number, or is applied orthogonal to the magnetic field for the transitions in which $\Delta l=2$ or $\Delta s=1$, where $s$ represents the spin state of the scattering mobile charge carriers.

Background of the invention

In the coherent optical device art, a highly desirable sort of device is one that is tunable over a broad band of frequencies. Recent proposals for such devices employing inelastic scattering from mobile charge carriers in the presence of a magnetic field in materials having nonparabolic conduction bands are disclosed in the copending patent application of P. A. Wolff, Ser. No. 52,-174, filed Jan. 1, 1966, and in the copending patent application of P. A. Fluery, C. K. N. Patel, R. E. Slusher and Y. Yafet, Ser. No. 637,796, filed May 11, 1967, both of which are assigned to the assignee hereof. The conduction band is said to be nonparabolic when the energies of the mobile charge carriers are substantially nonparabolic functions of their momenta.

Those applications describe types of scattering from mobile charge carriers in nonparabolic conduction bands that can be termed Landau-Raman scattering. By Landau-Raman scattering, we mean that the scattering is inelastic, in that some of the input light energy is either absorbed by the electrons or additional energy is emitted by the electrons, and that the absorption or emission involves the quantized energy levels known as Landau levels, which are produced by the magnetic field. Thus, the coherent output energy is characterized by a photon energy equal to the input photon energy minus the quantum of absorbed energy, or plus the quantum of emitted energy. Thus far, three types of processes responsible for inelastic scattering have been found: spin flip, i.e., $\Delta s=1$, $\Delta l=1$, and $\Delta l=2$ where $l$ is the Landau level quantum number and $s$ is the spin state. The spin-flip transition is characterized by a change in the spin state of the carrier. The wavelengths of all these transitions can be tuned over significant ranges by varying the magnitude of the magnetic field. Since a substantial concentration of the mobile charge carriers appears to be desirable, the mobile charge carriers can be called, broadly, a plasma; and the scattering can be called a plasma effect.

Summary of the invention

According to our invention, the cross-sections for Landau-Raman scattering from a plasma in nonparabolic-conduction-band materials is increased by application of a suitable electric field. The electric field is parallel to the applied magnetic field for the $\Delta l=1$ transition and orthogonal to the applied magnetic field for the $\Delta l=2$ and spin-flip transitions. An information-modulated electric field such as can be applied through a waveguide to the material will produce information-modulated scattered light.

The cross-section for Landau-Raman scattering via a given energy transition is the probability that any arbitrary one of the input photons will be scattered in a process involving that transition.

One advantage of our invention as applied to oscillators, apart from the capability of modulation, is that the increased scattering cross-sections enable oscillation at substantially lower concentration levels of the mobile charge carriers than would otherwise be possible. Reduced attenuation of the scattered coherent light will be obtained with the lower concentration levels of mobile charge carriers.

Brief description of the drawing

A more complete understanding of our invention can be obtained from the following detailed description taken together with the drawing in which:

FIG. 1 is a partially pictorial and partially schematic illustration of a first embodiment of the invention;

FIG. 1A is an enlarged pictorial view of a portion of the apparatus of FIG. 1;

FIG. 3 is a partially pictorial and partially schematic illustration of a second embodiment of the invention.

Detailed description of illustrative embodiments

Figure 2:
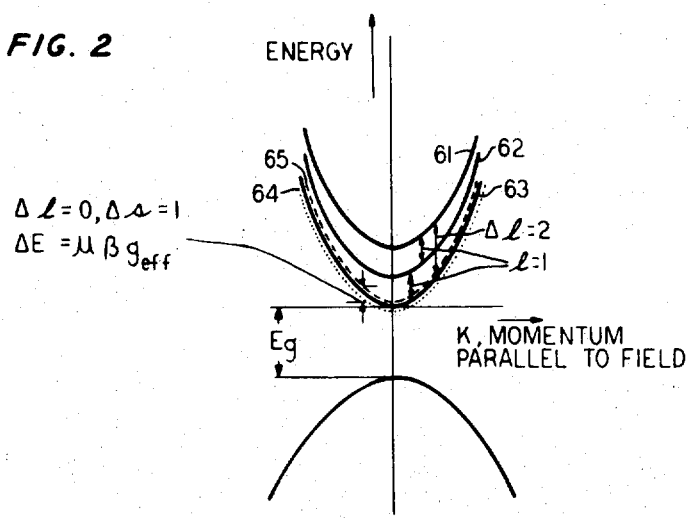
FIG. 2 shows an energy level diagram that will be helpful in understanding the operation of the invention.

In the embodiment of FIG. 1, the high-power carbon dioxide laser 11 supplies coherent pumping radiation to the tunable Raman laser 12.

The high-power pumping laser 11 is of the type described in the copending patent application of C. K. N. Patel, Ser. No. 495,844, filed Oct. 14, 1965, and assigned to the assignee hereof. It typically includes reflectors 13 and 14 forming a suitable resonator, DC power sources 18 connected in appropriate polarity between the anode and the cathodes, the carbon dioxide, helium and nitrogen sources 20, 21 and 22, respectively, connected to the inlet apparatus 19, and means for Q-switching the laser, including means 25 for rotatably mounting reflector 13, and a Q-switching motor 24 coupled to reflector 13 to rotate it. The reflector 14 has a transmissive central portion through which the output coherent radiation is directed toward Raman laser 12. From the laser 11, as described, this radiation typically has a wavelength of 10.6 mcirons. The laser 11 should provide radiation having a photon energy less than the bandgap energy of body 31 in laser 12. The lens 38 focuses the beam in body 31 to a spot size about $1.0 \times 10^{-4}$ square centimeters.

In the embodiment of FIG. 1, the polarizer 39 polarizes the coherent laser radiation to be orthogonal to the direction of the magnetic field, which is directed along the axis of the coil 35 in laser 12.

The Raman oscillator 12 comprises a body of n-type indium antimonide (InSb) of dimensions 1×2×10 millimeters, the 2 millimeter dimension separating the reflectors 32 and 33 that form the resonator for the scattered radiation. The body 31 of indium antimonide has a donor impurity concentration of $5 \times 10^{15}$ per cubic centimeter and has a 45 degree rooftop reflector 36, of which both surfaces are parallel to the polarization of the pumping radiation from laser 11, which is shown directed out of the paper in FIG. 1. Reflector 36 permits substantially no transmission of the pumping radiation. While the body 31 is illustratively single-crystal material, an appreciable effect can also be obtained in polycrystalline material, since the oscillations depend primarily on the plasma of mobile charge carriers. The Raman oscillator 12 further includes the Helmholtz coil 35 adapted to provide a uniform magnetic field within body 31. The coil 35 is energized from the DC voltage source 45 connected through the variable current-limiting resistance 37 to the terminals of coil 35. The coil 35 is oriented to supply a magnetic field orthogonal to the polarization of the pumping radiation and parallel to the direction of propagation of the pumping radiation. The body 31 is disposed at the focus of a parabolic reflector 34, which has its axis along the direction of propagation of the pumping radiation and has an aperture at its vertex in the vicinity of the input end of the body 31 to admit the pumping light.

A cooling apparatus (not shown) may also be provided to cool the body 31, preferably to 77 degrees Kelvin or lower. Typically, it would comprise one or more cold fingers on a lateral surface of the body 31 beyond the limits of the reflectors 32 and 33.

The receiver 41 receives the tunable light scattered through the analyzer 40 which passes light of the desired polarization. Illustratively, the receiver 41 might include a material being tested with the tunable light, plus a photodetector. Nevertheless, it could be any one of a number of other means for utilizing the tunable light.

As shown in more detail in FIG. 1A, the apparatus of FIG. 1 additionally includes the electric field electrodes 42 and 43 disposed on lateral surfaces of the body 31 beyond the limits of the reflectors 32 and 33 and a relative orientation that provides an axial electric field. The electrodes 42 and 43 are illustratively rings. The electric field produced between electrodes 42 and 43 is substantially in the same direction as the magnetic field produced by coil 35. Connected between electrodes 42 and 43 is the variable DC voltage source 44.

The strength of the magnetic field of coil 35 should be such that the spacing of the Landau, or cyclotron energy, levels of conduction band electrons in body 31 is less than the photon energy of radiation from laser 11, or less than half the photon energy of the pumping radiation for $\Delta l=2$ transitions, but sufficient to provide a significant frequency spacing between spin sublevels or the cyclotron energy levels. For indium antimonide, fields up to 150 kilo oersteds appear reasonable for $\Delta l=1$ transition; or up to half that value for $\Delta l=2$ transition. Considerably higher magnetic fields can be utilized for the spin-flip transition. Also, for other materials, such as indium arsenide, that have larger band gaps, larger magnetic fields would be used in each case.

The strength of the electric field between electrodes 42 and 43 is such that the momentum imparted to the conduction band electrons parallel to the magnetic field in less than the momentum at which they would couple substantial energy to the lattice vibration known as the optic phonon. For indium antimonide, this value of electric field is 100 volts per centimeter.

The indium antimonide body 31 is grown to include a doping impurity such as selenium or tellurium in sufficient quantity to render the body 31 n-type with the desired concentration of mobile electronic charge carriers. In practice, the charge carrier concentration can vary between about $5 \times 10^{13}$ and $1 \times 10^{18}$ per cubic centimeter. Since one of the advantages of the present invention involves the ability to use reduced charge carrier concentrations, a preferred range is from $5 \times 10^{13}$ to $1 \times 10^{16}$ mobile charge carriers per cubic centimeter. Although selenium and tellurium are preferred dopants, sulfur or other donor impurities might be employed.

Instead of indium antimonide, body 31 could also be indium arsenide, gallium arsenide, lead selenide, lead telluride, mercury telluride or certain alloys of mercury telluride, to the extent the latter have band gap energies greater than 0.12 electron volt. Alternatively, p-type materials of the compounds above recited can also be used, preferably with application of uniaxial stress. In general, any body of material having nonparabolic conduction bands could be employed. Charge carrier concentrations in the alternative materials could vary between about $1 \times 10^{13}$ and $1 \times 10^{18}$ per cubic centimeter, a preferred range being $1 \times 10^{15}$ to $1 \times 10^{16}$.

The reflectors 32 and 33 are illustratively thin layers of vacuum-deposited metal or dielectrics. Alternatively, they could be highly polished surfaces of the body 31; or they could be spaced from the major surfaces of the body 31, if a high resonator Q is desired. They could also provide focusing.

The coil 35 could be a field coil or a Helmholtz coil, which has its two sections spaced apart about body 31 by approximately the coil radius and connected in series or parallel. In operation, the coherent 10.6 micron radiation from the Q-switched carbon dioxide laser 11 is incident upon the body 31 in pulses having peak power in the range from 1 to 100 kilowatts. It is focused to a cross-sectional area at the body 31 that is sufficient to exceed the threshold power density for stimulated Raman radiation therein. If the threshold power density is otherwise supplied (i.e., on a CW basis), Q-switching of laser 11 is unnecessary.

Reference is now made to the energy level diagram of FIG. 2 in which the different trnasition are represented. The curves 61, 62 and 63 represent the total energy versus the momentum component parallel to the field for charge carriers subjected to the magnetic field. The separation of these curves represents a quantizing of the energy for any particular momentum parallel to the field. These energy states have a nonzero energy breadth and are also split by the differing possible spin states of the charge carriers. Two of the possible spin energy states between which spin-reversal transitions can occur are illustratively those indicated by dashed curve 65 and dotted curve 64.

The energy separation of the Landau levels is approximately $$h\nu_c = \frac{\hbar e B}{m^* c} \qquad (1)$$

where $h$ is Planck's constant in appropriate units, $$\hbar = \frac{h}{2\pi}$$

$\nu_c$ is the cyclotron frequency, $c$ is the velocity of light, $m^*$ is the effective mass of an electron in the conduction band of body 31, $e$ is its charge and B is the magnetic field strength.

The energy separation of spin states between which a spin-reversal transition can occur is $$h\nu_s = \mu_B g_{eff} B \qquad (2)$$

where $h$ is Planck's constant in appropriate units, $\nu_s$ is the spin frequency shift, $\mu_B$ is the Bohr magnetron, $g_{eff}$ is the effective gyromagnetic ratio within the body 31 and B is the magnetic field strength.

For indium antimonide, the effective mass of an electron is approximately 0.014 to 0.016 of the mass of a completely free electron; and the effective $g$ factor is about 40 and negative.

As indicated heretofore, the curves 61, 62 and 63 are not perfect parabolas. The nonparabolicity can be said to be substantial when the effective mass of the mobile charge carriers can vary as much as ten percent. Inelastic scattering is made possible by such substantial nonparabolicity.

The $\Delta l=2$ transition is represented by the double-headed vertical arrow between curves 61 and 63; but, in general, could be any similar upward transition between a Landau level and the second higher Landau level. Although the downward transition is theoretically possible, it would be weaker by an amount equal to the Boltzmann factor at the sample temperature, and would increase the photon energy of the scattered light rather than decrease it. The $\Delta l=1$ transition is represented by double-headed vertical arrow between curves 61 and 62, but likewise could be a similar transition between any two adjacent Landau level curves. The spin-flip transition is represented by the vertical displacement between the dashed curve 65 and dotted curve 64 as indicated by the two short arrows. Techniques for preferring some of these transitions over others are disclosed in the above-cited copending patent applications of P. A. Wolff and of P. A. Fleury et al.

The effect of the applied electric field, which is parallel to the magnetic field in the embodiment of FIG. 1, is to increase the drift rate, and hence the momentum of the mobile charge carriers in the direction of the electric field and hence parallel to the magnetic field. Thus, until these charge carriers lose some of their acquired momentum through energy loss, such as energy coupled to the optic phonon, they move farther out from the vertices of curves 61, 62 and 63 in FIG. 2. These curves are more highly nonparabolic in this region than in the region of their vertices. The scattering cross-section for the $\Delta l=1$ process is directly proportional to the total axial momentum (i.e., parallel to the magnetic field). Thus, on causing the electrons to drift axially, the electric field increases the Raman scattering cross-section for the $\Delta l=1$ transition. Additionally, it is shown in the above-cited copending patent application of P. A. Wolff that the probability of scattering is directly dependent upon the nonparabolicity of the conduction band. Because of the larger scattering cross-section, the oscillation threshold within the optical resonator formed by reflectors 32 and 33 is reached with a lower charge carrier concentration and/or with a lower pumping power density from the laser 11 than would otherwise be possible. The scattered light is emitted through the reflectors 32 and 33 and is collected and focused by the parabolic reflector 34 to propagate through analyzer 40 into receiver 41.

The enhanced scattering can also be achieved by increasing the distortion of the cyclotron orbits of the mobile charge carriers as well as by increasing their drift rate parallel to the magnetic field. In general, the charge carriers will be describing a helical-type motion, as the result of having components of motion both parallel and perpendicular to the magnetic field. Their cyclotron orbits can be visualized as projections of their motion on a plane perpendicular to the magnetic field. Increased distortions of the cyclotron orbits are also equivalent to increased nonparabolicity of the conduction band for the charge carriers; but, in this case, the scattering cross-sections for the $\Delta l=2$ and the spin-flip transitions will be particularly enhanced.

An embodiment which will achieve the described enhancement of the scattering cross-sections for the $\Delta l=2$ and spin-flip transitions is shown in FIG. 3. Here, components numbered the same as in FIG. 1 are identical thereto; and analogous components such an analyzer 90 and receiver 91 are numbered fifty digits higher. In the embodiment of FIG. 3, the principal modification is that the reflectors 82 and 83 serve simultaneously as electrodes for the application of the electric field to enhance the scattering cross-sections. It will be seen that the electric field will be orthogonal to the magnetic field. The scattered radiations will be transmitted through the electrodes 82 and 83. Illustratively, electrodes 82 and 83 are metallic thin films which are chosen to provide some reflectivity for the scattered wavelengths but also some transmission. In this case, the strength of the applied electric field from the variable source 44 is not inherently limited by the optic phonon because the added energy is imparted to the mobile charge carriers in a direction orthogonal to the magnetic field by means of distortions of the cyclotron energy orbits. The effect of these distortions is not readily portrayed in the curves of FIG. 2; but, in general, they do not permit the moments of the charge carriers to rise to the level at which they would couple energy to the optic phonon. The ultimate limits on the strength of the field are determined by the stability of the material of the body 31.

In operation, the distortion of the cyclotron energy orbits by the field between electrodes 82 and 83 will cause increased scattering via the $\Delta l=2$ and spin-flip transitions and permit achieving of oscillations at a lower mobile charge carrier concentration and/or with a lower pumping power density than would otherwise be possible. Some of the scattered light is transmitted through reflectors 82 and 83, is collected and focused by the parabolic reflector 34, and directed through analyzer 90 to receiver 91. An enlarged view of the body 31 with its reflector-electrodes 82 and 83 is shown in FIG. 3A. Typically, the electrodes would be parallel, as shown.

Figure 4:
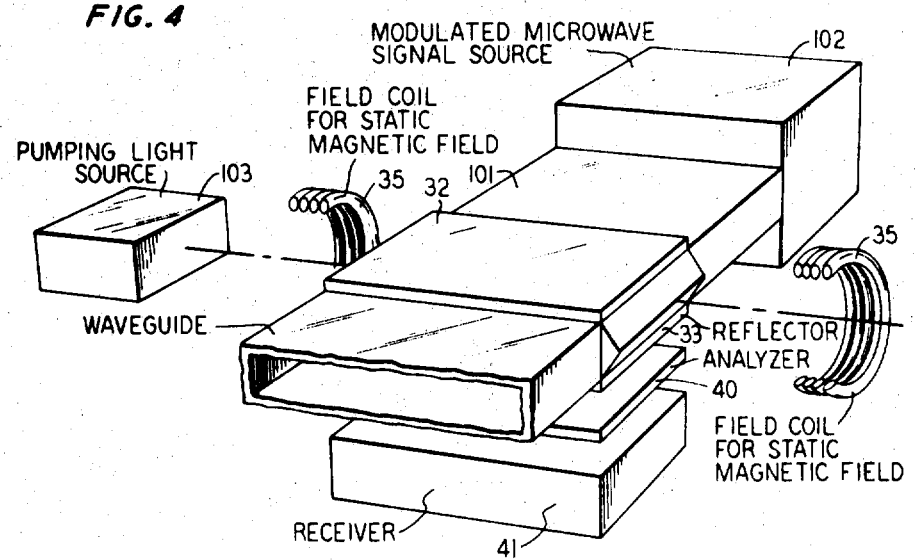
FIG. 4 is a partially pictorial and partially block diagrammatic illustration of a modulator according to the present invention.

The controllable enhancement of scattering provided by a variable electric field makes possible the information modulation of the scattered light to produce an amplitude-modulated output signal. An embodiment for achieving such modulation is shown in FIG. 4. The principal modification provided for in the embodiment of FIG. 4 is that the electric field is applied to the body 31 through a waveguide 101 from a modulated microwave signal source 102. It may be readily seen that the relative dimensions of the waveguide and the propagating microwave mode may be chosen so that the modulating electric field $E_m$ is either parallel to the magnetic field or orthogonal to the magnetic field as in the embodiments of FIGS. 1 and 2, respectively. Illustratively, the electric field is parallel to the magnetic field and the strength of the light scattered by the $\Delta l=1$ transition is amplitude-modulated by the information signal from source 102. The scattered light is then transmitted through reflector 33' and analyzer 40 to receiver 41', which would include conventional detection and output circuits for an amplitude-modulated signal. The reflector 32' would be as highly reflecting as possible and essentially nontransmitting in the illustrated embodiment. Nevertheless, it could be made partially transmitting if a parabolic reflector as in the preceding embodiments were used to collect the scattered radiation and the analyzer 40 and receiver 41' were reoriented to receive the scattered light thus collected.

What is claimed is:
1. A coherent optical device comprising
   a body of semiconductive material having a nonparabolic conduction band and a substantial concentration of mobile charge carriers in said conduction band, said body having surfaces forming an optical resonator,
   means for applying a magnetic field to said body to produce Landau level quantization of the energies of said charge carriers,
   means for applying to said body coherent infrared pumping radiation in a direction to produce Landau-Raman scattering from said mobile charge carriers along the axis of said resonator, and
   means for applying an electric field to said body to increase the cross-section for Landau-Raman scattering.
2. A coherent optical device according to claim 1 in which the electric field applying means comprises means for applying an electric field parallel to the magnetic field and of a value that increases the momentum of the mobile charge carriers in a direction parallel to the field to a momentum less than that momentum which would yield energy coupling to the lattice vibration known as the optic phonon, in order to increase the cross-section for Landau-Raman scattering in which the change in Landau level quantum number is unity.

3. A coherent optical device according to claim 1 in which the electric field applying means comprises means for applying an electric field orthogonal to the magnetic field and of a value that substantially increases the distortion of the cyclotron orbits of the mobile charge carriers to increase the cross-section for Landau-Raman scattering in which the change in Landau level quantum number is either two or zero and in which a corresponding change in spin state is either zero or unity, respectively.

4. A coherent optical device according to claim 1 in which the electric field applying means comprises means for applying an information-modulated electric field to produce amplitude-modulated coherent scattered light.

References Cited

UNITED STATES PATENTS

| | | | |
|---|---|---|---|
| 3,300,653 | 1/1967 | Boyd et al. | 307—88.3 |
| 3,328,723 | 6/1967 | Giordmaine et al. | 330—4.5 |

JOHN KOMINSKI, Primary Examiner

DARWIN R. HOSTETTER, Assistant Examiner

U.S. Cl. X.R.

307—88.3; 321—69; 330—4.5; 331—94.5